United States Patent [19]

Buchwald et al.

[11] Patent Number: 5,393,442

[45] Date of Patent: Feb. 28, 1995

[54] COMPOSITIONS CONTAINING 1-CHLORO-2,2,2-TRIFLUOROETHYL DEFLUOROMETHYL ETHER

[75] Inventors: Hans Buchwald, Ronnenberg; Joachim Hellmann, Hannover; Boleslaus Raszkowski, Wiedensahl, all of Germany; Pierre Barth-Elemy, Jodoigne; Mireille Paulus, Bruxelles, both of Belgium

[73] Assignee: Solvay Fluor und Derivate GmbH, Hannover, Germany

[21] Appl. No.: 38,944

[22] Filed: Mar. 29, 1993

[30] Foreign Application Priority Data

Apr. 1, 1992 [DE] Germany ............................ 4210700

[51] Int. Cl.$^6$ .......................................... C10M 129/16
[52] U.S. Cl. ........................................ 252/54; 252/54.6; 252/68; 72/42; 106/38.22
[58] Field of Search ..................... 252/54.6, 54, 68; 72/42; 106/38.22

[56] References Cited

U.S. PATENT DOCUMENTS

| | | | |
|---|---|---|---|
| 3,535,388 | 10/1970 | Terrell | 260/614 |
| 3,846,332 | 11/1974 | Croix | 252/364 |
| 4,659,493 | 4/1987 | Feist et al. | 252/54.6 |
| 4,746,463 | 5/1988 | Feist et al. | 260/410.9 R |
| 5,300,253 | 4/1994 | Buchwald et al. | 252/194 |

FOREIGN PATENT DOCUMENTS 4006688 9/1991 Germany .

*Primary Examiner*—Prince Willis, Jr.
*Assistant Examiner*—Cephia D. Toomer
*Attorney, Agent, or Firm*—Evenson, McKeown, Edwards & Lenahan

[57] ABSTRACT

Liquid compositions useful as release agents or cooling lubricants containing 1-chloro-2,2,2-trifluoroethyl difluoromethyl ether and an agent having a lubricant and/or release action and optionally further conventional additives for release agents or cooling lubricants, the use of such compositions as release agents or cooling lubricants, and a process for preparing such compositions.

31 Claims, No Drawings

COMPOSITIONS CONTAINING 1-CHLORO-2,2,2-TRIFLUOROETHYL DEFLUOROMETHYL ETHER

BACKGROUND OF THE INVENTION

The present invention relates to the use of 1-chloro-2,2,2-trifluoroethyl difluoromethyl ether as a constituent of liquid compositions which are useful as release agents and cooling lubricants; to the use of these compositions as release agents and/or cooling lubricants; and to a process for their preparation.

In many industrial operations it is necessary to use auxiliaries by means of which the affinity between different materials, for example work piece and tool or molded article and mold, can be kept as low as possible. This is generally achieved, depending on the operation, by the use of release agents or cooling lubricants. Thus, release agents are needed in processes for preparing and processing plastics, foams, building materials, rubber articles, tires, metals, glasses, ceramic products and the like. Such process include production steps such as casting, molding, pressing and the like. As used herein, the term "release agents" refers to agents which form solid or liquid films which reduce the adhesion forces between two adjacent surfaces, that is to say which prevent adjacent surfaces from sticking together and thus are effective as release agents, peel agents or lubricants. Release agents may be solutions or dispersions of agents which exhibit a release action.

The cutting, separating or abrasive machining of metals, that is to say metal machining operations such as, for example, drilling, cutting, punching, milling, turning and grinding, are usually carried out in the presence of cooling lubricants. In addition to cooling and lubricating, these lubricants also serve to prevent welding between work piece and tool. Excessively rapid wear of the tools is additionally prevented.

According to K. Schardt, *Kunststoffe,* Vol. 72, P. 461-62 (1982) it is known to use silicones, metal soaps, waxes, fatty oils, synthetic polymers and inorganic substances as release agents. Solvents disclosed as useful in release agent compositions include liquid aliphatic hydrocarbons, halogenated hydrocarbons and water.

German Published Patent Application No. DE 3,335,870 describes the preparation of special wax derivatives having a lubricant and/or release action which can be included together with solvents in release agents or cooling lubricants. Suitable solvents include the chlorofluorohydrocarbons: trichloromonofluoromethane, 1,1,2-trichloro-1,2,2-trifluoroethane, 1,1,2,2-tetrachlorodifluoroethane, tetrachloromonofluoroethane and trichlorodifluoroethane.

Despite much past effort at developing useful release agents and cooling lubricants, there remains a need for improved release agents and improved cooling lubricants.

SUMMARY OF THE INVENTION

It is the object of the present invention to provide improved compositions for use as release agents or cooling lubricants.

Another object of the invention is to provide compositions for use as release agents or cooling lubricants with better environmental acceptability.

It is also an object of the invention to provide a method of preventing a shaped article from adhering to a forming tool against which it is shaped.

A further object of the invention is to provide a method of machining a metal article in which overheating of the metal article and excessive wear of a tool used to machine the article are prevented.

It is also an object of the invention to provide a process for preparing improved release agent and lubricant compositions.

These and other objects of the invention are achieved by providing liquid composition useful as a release agent or coolant lubricant comprising 1-chloro-2,2,2-trifluoroethyl difluoromethyl ether and at least one agent having a lubricant or release action.

In accordance with a further aspect of the invention, the objects are achieved by providing a method of a process for forming a shaped article comprising the steps of forming the article to a desired shape against a forming tool, and thereafter separating the formed article from the forming tool, wherein the forming tool is coated with an effective release promoting amount of a liquid composition comprising 1-chloro-2,2,2-trifluoroethyl difluoromethyl ether and at least one agent having a release action.

In accordance with yet another aspect of the invention, the objects are achieved by providing a process for forming a metal article comprising the step of machining a piece of metal with a tool, wherein an effective cooling and lubricating amount of a liquid composition comprising 1-chloro-2,2,2-trifluoroethyl difluoromethyl ether and at least one agent having a lubricant action is introduced between said piece of metal and said tool.

The objects of the invention are also achieved by providing a process comprising incorporating into 1-chloro-2,2,2-trifluoroethyl difluoromethyl ether an effective lubricating or release promoting amount of at least one agent having a lubricant or a release action.

DETAILED DESCRIPTION OF PREFERRED EMBODIMENTS

Liquid compositions which are suitable as release agents and cooling lubricants have now been found which contain 1-chloro-2,2,2-trifluoroethyl difluoromethyl ether and an agent having a lubricant and/or release action and optionally one or more conventional additives for release agents and cooling lubricants selected from the group consisting of evaporation-control agents, solubilizers, corrosion inhibitors and stabilizers.

In one advantageous embodiment, the liquid compositions useful as release agents and cooling lubricants contain at least 15% by weight of 1-chloro-2,2,2-trifluoroethyl difluoromethyl ether. For example, they may contain amounts in the range from 15 to 99.9% by weight. In addition, they contain from 0.1 to 80% by weight, preferably 0.1 to 40% by weight, of at least one agent having a lubricant and/or release action, and optionally up to 80% by weight of solubilizers and/or evaporation-control agents.

As the agent having a lubricant and/or release action the compositions according to the invention may contain one or more substances selected from the group consisting of waxes and wax derivatives and/or an agent having a release action selected from the group consisting of paraffins, silicones, metal soaps, fats, oils, polymers and inorganic powders. As used herein, the term "waxes and wax derivatives" is intended to include both naturally occurring waxes of animal or vegetable origin and also synthetic waxes and wax derivatives. Among the naturally occurring waxes, it is preferred to use those which have a softening point of at least 40° C.

In one preferred embodiment of the invention, the compositions according to the invention contain waxes and/or wax derivatives selected from the group consisting of the esters of long-chain carboxylic acids and monoalcohols having a total of 34 to 50 carbon atoms and derivatives thereof obtained by sulfochlorination or sulfidization, by hydrogenation, or by treatment with hydrogen fluoride. Esters which have an iodine value of less than 95 are preferred. Esters having an iodine value in the range from 75 to 95 are particularly preferred. Mixtures of such fatty acid esters have already been described in the literature and are commercially available.

For example, wax derivatives which have been obtained by sulfochlorination, sulfidization hydrogenation or hydrogen fluoride treatment of unsaturated long-chain esters of carboxylic acids with monoalcohols having a total of 34 to 50 carbon atoms are suitable. The sulfochlorinated and sulfidized esters are available as commercial products.

It is also possible to use the wax derivatives which have been obtained in the form of partially saturated or completely saturated derivatives by hydrogenation of unsaturated long-chain esters of carboxylic acids with monoalcohols having a total of 34 to 50 carbon atoms. As used herein, the term "partially saturated derivatives" refers to derivatives which have an iodine value less than that of the educt used for the hydrogenation. For example, esters which have iodine values of less than about 40 can be used as partially saturated to saturated derivatives. Both the partially saturated and the saturated esters are commercially available.

It is also possible to use wax derivatives which have been obtained by hydrogen fluoride treatment of unsaturated long-chain esters of carboxylic acids with monoalcohols having a total of 34 to 50 carbon atoms. The derivatives obtained by hydrogen fluoride treatment include, for example, the fluorine-containing, waxy compositions disclosed in Published German Patent Application No. DE 3,335,870, the fluorine contents of which are variable over a wide range. For example, the fluorine content of these adducts of hydrogen fluoride with unsaturated long-chain esters may range from 0.1 to 4.3% by weight.

A completely different type of derivative obtainable by hydrogen fluoride treatment of these long-chain unsaturated esters, are oily products (referred to hereinafter as sesquimers) which have a molecular weight 1.1 to 1.9 times that of the starting wax and which also have an unreacted wax content of less than 1% by weight. These wax derivatives contain very little, if any, bonded fluorine. As a rule, the fluorine content is less than 0.1% by weight, and the iodine value is in the range from 5 to 20.

Other waxes which can be used for the purposes of the present invention include paraffin waxes or synthetic polymers such as, for example, optionally oxidized polyethylene waxes. Thus, for example, an oxidized polyethylene wax which has an average molecular weight of 3,700 to 4,500 (determined by viscometry) is suitable.

The compositions according to the invention may also contain silicones as release agents. Silicones in the form of oils, fats or resins may be used, either as such, or in the form of silicone emulsions or silicone pastes which contain a consistency-control agent such as highly disperse silica incorporated in the silicone oil. Silicone fats usually contain metal soaps as consistency-control agents. The silicone products used in the present invention are commercially available products. The silicone oil used can be, for example, a silicone oil which has a broad viscosity range in the range from 100 to 60,000 mm$^2$/s, in particular a viscosity in the range from 10,000 to 30,000 mm$^2$/s, and especially a viscosity in the range from 15,000 to 25,000 mm$^2$/s.

Other suitable agents having a release action include metal soaps, for example fatty acid salts of the metals magnesium, calcium, zinc, aluminium or lead. For example, metal salts of stearic acid may be used. In such a case, it is preferred to use magnesium stearate.

As further agents having a release action the compositions according to the invention can also contain inorganic powders, preferably graphite, talc or mica.

Other conventional agents which have release properties, such as oils, for example mineral oils and ester oils, also may be used in the compositions according to the invention. Further suitable agents having a release action include polymers, for example polymer alcohols, such as, for example, polyethylene glycol, polyamides, polyolefins or polytetrafluoroethylene waxes.

In a preferred embodiment of the invention, the compositions according to the invention contain conventional solubilizers and/or evaporation-control agents for release agents or cooling lubricants. Suitable solubilizers or evaporation control agents may be selected from the group consisting of liquid aliphatic hydrocarbons which have boiling points of up to 200° C. lower alcohols having 1 to 5 carbon atoms, lower ketones and lower carboxylic acid esters. The solubilizers generally serve to improve the dissolution of the agents having a release and/or lubricant action used in the compositions, in particular to improve the dissolution of the saturated, partially saturated and/or sulfochlorinated or sulfidized derivatives, and/or derivatives obtained by hydrogen fluoride treatment, of esters of long-chain carboxylic acids and monoalcohols having a total of 34 to 50 carbon atoms. The purpose of evaporation-control agents is generally to prevent the compositions evaporating too rapidly during use, for example as cooling lubricants.

The solubilizers and/or evaporation-control agents preferably used in the liquid compositions according to the invention, which are suitable as release agents and cooling lubricants, are liquid aliphatic hydrocarbons which have boiling points of up to 200° C., lower aliphatic alcohols or lower carboxylic acid esters which are able to form an azeotrope or azeotrope-like mixtures with 1-chloro-2,2,2-trifluoroethyl difluoromethyl ether. Examples of suitable solubilizers and/or evaporation-control agents include lower alcohols, for example methanol, ethanol, n-propanol and isopropanol; lower carboxylic acid esters, such as, for example, methyl acetate; liquid aliphatic hydrocarbons, for example petroleum fractions which have boiling points of up to 200° C., e.g. heptane or petroleum fractions which have a boiling range of 100° to 140° C. Of course, other known solubilizers and/or evaporation-control agents can also be used.

Advantageously, the compositions according to the invention contain the solubilizers and/or evaporation-control agents in an amount of 1 to 80% by weight, preferably 1 to 40% by weight.

In further embodiments of the compositions according to the invention, it can be advantageous to add known stabilizers and/or corrosion inhibitors in an amount of up to 1% by weight. The compositions according to the invention which are suitable as release agents and cooling lubricants can therefore contain commercially available corrosion inhibitors for metals, such as, for example, magnesium, aluminium, titanium, brass, bronze or steel. Corrosion inhibitors of this type are usually compositions which contain organic compounds containing hetero atoms such as sulfur or, in particular, nitrogen. For example, individual compounds or mixtures of benzothiazoles, for example mercaptobenzothiazole; benzimidazoles, for example 2-phenylbenzimidazole; triazoles, for example benzotriazoles and tolyltriazoles; oxazolines, for example alkyl- and/or hydroxyalkyl-substituted oxazolines; amides and amines, for example tertiary amines, have proved suitable. Corrosion inhibitors based on oxazoline have proved particularly advantageous.

In addition, conventional stabilizers or consistency-controlling additives can optionally be added to the compositions according to the invention.

The concentrations of the agents having a lubricant and/or release action in the compositions according to the invention may vary depending on the intended use. Thus, compositions useful as cooling lubricants may contain from 0.1 to 25% by weight, preferably 0.5 to 5% by weight of the above-mentioned waxes and/or wax derivatives as agents having a lubricant action. In one advantageous variant which is particularly suitable as a cooling lubricant, the above-mentioned solubilizers and/or evaporation-control agents are present in an amount of from 1 to 40% by weight, preferably 1 to 15% by weight.

Compositions useful as release agents preferably contain from 0.1 to 35% by weight of an agent having a release action. Compositions useful as release agents also may contain conventional solubilizers in amounts of up to 80% by weight. Preferred release agent compositions comprise as solubilizers, from 10 to 80% by weight of petroleum fractions which boil within the range from 100° to 140° C.

The compositions according to the invention may be either solutions or dispersions. As used herein, the term "dispersions" refers to both emulsions and suspensions.

The invention also relates to a process for preparing compositions according to the invention, which process comprises incorporating one or more agents having a lubricant and/or release action and optionally further conventional release agent or cooling lubricant additives selected from the group consisting of evaporation-control agents, solubilizers, corrosion inhibitors and stabilizers, into 1-chloro-2,2,2-trifluoroethyl difluoromethyl ether.

In addition the invention also includes the use of the compositions as cooling lubricants or as release agents, for example in the preparation of plastics or foams or in other fields of use.

The cooling lubricant compositions according to the invention can be used in all known methods of machining metals. Thus, the compositions according to the invention can be applied in either liquid or aerosol form during metal machining, for example. In addition, the compositions according to the invention can be applied both externally, that is to say supplied to the tool from the outside, or internally, that is to say through suitable feeds provided in the tool itself. Internal application is used, for example, when carrying out deep drilling or in the case of internal grinding. The compositions according to the invention can also generally be used as cooling lubricants for abrasive treatment of hard surfaces.

Use of the compositions according to the invention in processes for cutting, separating or abrasive machining of metals results in a distinctly lower energy consumption compared with the use of prior art cooling lubricants, especially in the case of cutting, separating or abrasive treatment of metals such as magnesium, aluminium, titanium, brass, bronze or steel. This result is particularly clearly evident when more compact metal parts are, for example, to be drilled, milled or cut. In addition, when the compositions according to the invention are used as cooling lubricants in metal machining processes, good removal of the slivers is ensured and built-up edges are prevented. The compositions according to the invention have very advantageous frictional wear values, which is an indication of their very good cooling and lubricant properties.

The compositions according to the invention can also be used as release agents, for example in metal or plastic processing. The compositions according to the invention advantageously lower the adhesion between tool and work piece or mold and molding, which may be formed of metal or plastic material, for example of polyesters, silicone polymers or polyurethanes. The compositions according to the invention are particularly suitable as release agents in the production of shaped plastic articles, particularly foamed articles. By using compositions according to the invention as release agents, surface problems can be avoided between tool and work piece, for example in injection molding of plastics. The compositions according to the invention can be successfully used as release agents in foaming of polyurethane, with little or no impairment of foam formation. In this context, one advantage of the release agents according to the invention is that they can be highly energy-saving in use. As is known, in the production of foams the solvent must first be evaporated after coating the mold with the release agent. Much less heating of the mold is required to evaporate the solvent from the composition according to the invention than from conventional prior art compositions. The release agents according to the invention are also a valuable production aid facilitating mold release when molding plastics. Additional advantages of the compositions according to the invention become evident during long-term mold use, for example in that the molds need less frequent cleaning between operations. The release agents according to the invention can be used in conventional manner, for example in the form of liquids, pastes or sprayable release agents which can be applied, for example, using commercial spray equipment, aerosol cans or automatic spray systems.

The compositions according to the invention containing 1-chloro-2,2,2-trifluoroethyl difluoromethyl ether as a diluent or solvent have good adhesion-lowering properties, are highly chemically inert, and have a good spreading power and high yield. In addition, the high 1-chloro-2,2,2-trifluoroethyl difluoromethyl ether content in the compositions according to the invention has the effect of substantially raising the flash point, so that in some cases the composition virtually no longer has a flash point. The compositions according to the invention are particularly simple to prepare due to the very good dispersing and emulsifying power of 1-chloro-2,2,2-trifluoroethyl difluoromethyl ether.

The following examples are intended to illustrate the invention in further detail without restricting its scope.

EXAMPLE 1

A composition according to the invention was prepared by mixing together 5% by weight of HF-wax adduct, 21.0% by weight 1-chloro-2,2,2-trifluoroethyl difluoromethyl ether, and 74.0% by weight of a petroleum fraction having a boiling range of 100° to 140° C. As used herein, the term "HF-wax adduct" refers to a wax derivative obtained by hydrogen fluoride treatment of unsaturated long-chain esters of carboxylic acids with monoalcohols having a total of 34 to 50 carbon atoms, whereby hydrogen fluoride is added to the double bonds of the educt. The HF-wax adduct used in this example was prepared according to Example 1 of German Published Application No. DE 3,335,870. The composition according to the invention was obtained as a dispersion.

EXAMPLES 2 TO 11

Further examples of compositions according to the invention, which likewise possess outstanding release agent properties, were prepared analogously to Example 1 and are shown in the following table in which proportions of the components are listed in % by weight.

EXAMPLES 12 TO 26

The further examples 12 to 26 of compositions according to the invention which possess good lubricant properties and are suitable as cooling lubricants for cutting, separating and abrasive metal machining and are shown in the following table, were prepared analogously to Example 1. The components are given in % by weight.

| Composition Constituents | Example No. | | | | | | | | | | | | | | |
|---|---|---|---|---|---|---|---|---|---|---|---|---|---|---|---|
| | 12 | 13 | 14 | 15 | 16 | 17 | 18 | 19 | 20 | 21 | 22 | 23 | 24 | 25 | 26 |
| 1-Chloro-2,2,2-trifluoroethyl difluoromethyl ether | 95.0 | 95.9 | 93.2 | 92.8 | 64.2 | 97.0 | 95.9 | 94.7 | 94.3 | 63.7 | 94.2 | 94.5 | 92.6 | 63.0 | 93.5 |
| Sesquimer (iodine # 14) | | | | | | 3.0 | 1.5 | 1.5 | 1.5 | 1.0 | | | 3.0 | 1.5 | |
| Wax Ester (iodine # 90-80) | 5.0 | 1.5 | 3.0 | 3.0 | 0.5 | | | | | | 3.0 | 1.5 | | | 1.5 |
| Isopropanol | | 2.6 | | | | | 2.6 | | | | 2.6 | | | | |
| Ethanol | | | 3.8 | | | | | 3.8 | | | | 3.8 | | | |
| Methanol | | | | 4.2 | | | | | 4.2 | | | | 4.2 | | |
| Methyl Acetate | | | | | 35.3 | | | | | 35.3 | | | | 35.3 | |
| n-Heptane | | | | | | | | | | | | | | | 5.0 |
| Corrosion Inhibitor composed of Oxazoline | | | | | | | | | | | 0.2 | 0.2 | 0.2 | 0.2 | |
| Nature of Composition | D | S | S | S | S | D | D | D | D | D | S | S | D | D | S |

*Material from Example 2 of DE 3,335,870
**S = Clear Solution; D = Dispersion

EXAMPLE 27

In order to assess the release agent properties of compositions according to the invention, the inside surfaces of a mold used for producing foamed plastics were smeared with a thin layer of a composition according to the invention. The mold consisted of a polyethylene base plate, steel side walls and an aluminium cover plate. A conventional reaction mixture for producing polyurethane foams was poured into this mold, which had been treated with a composition according to the invention, and polymerized in a known manner to produce a polyurethane foam. The effectiveness of the composition according to the invention as a release agent was then assessed by how completely and how easily the resulting polyurethane foam could be released from the mold after the polymerization.

The following criteria were used as a basis for the assessment:

a) poor release action: foam adheres to inside surface of mold;

b) good release action: foam easily separated from inside surfaces of mold;

| Composition Constituents | Example No. | | | | | | | | | |
|---|---|---|---|---|---|---|---|---|---|---|
| | 2 | 3 | 4 | 5 | 6 | 7 | 8 | 9 | 10 | 11 |
| 1-chloro-2,2,2-trifluoroethyl difluoromethyl ether | 95.0 | 95.0 | 22.0 | 19.0 | 50.0 | 20.0 | 80.0 | 20.0 | 75.0 | 20.0 |
| Sesquimer* | 5.0 | | | | | | | | | |
| Wax Ester (iodine # 90-80) | | 5.0 | | | | | | | | |
| Wax Ester (iodine # 40-20) | | | 4.0 | | | | | | | |
| Wax Ester (iodine # 20-0) | | | | 5.0 | | | | | | |
| Silicone Oil (20,000 mm²/s) | | | | | 35.0 | | | | | |
| Paraffin (m.p. 56–58° C.) | | | | | | 6.0 | | | | |
| Oxidized Polyethylene Wax (m.p. 89–99° C.) | | | | | | | 6.0 | 4.0 | 10.0 | |
| Polyethylene Wax (m.p. 89–108° C.) | | | | | | | | | | 7.0 |
| Magnesium Stearate | | | | | | | | | 1.0 | |
| Petroleum Fraction (b.p. 100–140° C.) | | | 74.0 | 76.0 | 15.0 | 74.0 | 14.0 | 76.0 | 14.0 | 73.0 |
| Nature of Composition** | D | D | S | D | S | D | D | D | D | D |

*Material from Example 2 of DE 3,335,870
**S = Clear Solution; D = Dispersion c) excellent release action: no detectable adhesion between inside surfaces of mold and foam.

Seven polyurethane foam articles were produced in succession in a mold initially treated with the composition according to the invention, but without any intervening treatment of the mold with the composition of the invention between the successive molding operations. The following table shows the assessment of a composition according to the invention with respect to its suitability as a release agent. The composition of Example No. 8 was used in the tests.

| Number of Foam Molding Operations | Release Agent Effect |
|---|---|
| 1 | Excellent |
| 2 | Excellent |
| 3 | Excellent |
| 4 | Excellent |
| 5 | Excellent |
| 6 | Good |
| 7 | Poor |

The above results show that the composition according to the invention which was used in the test has an excellent release action for five successive foaming operations. This corresponds to approximately 70% of all tests carried out with this composition. A good or excellent release action was obtained for approximately 85% of all tests carried out with this composition.

Similarly excellent results were achieved using the release agent composition of Example 1 according to the invention and the release agent compositions defined by Examples 2 through 7 and 9 through 11.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A liquid composition useful as a coolant lubricant comprising 1-chloro-2,2,2-trifluoroethyl difluoromethyl ether, at least one agent having a lubricant action, and at least one additive selected from the group consisting of evaporation-control agents, solubilizers, corrosion inhibitors and stabilizers.

2. A composition according to claim 1, which comprises at least 15% by weight 1-chloro-2,2,2-trifluoroethyl difluoromethyl ether and 0.1 to 80% by weight of said at least one agent having a lubricant action.

3. A composition according to claim 2, which comprises from 0.1 to 40% by weight of said at least one agent having a lubricant action.

4. A composition according to claim 1, which comprises up to 80% by weight of at least one additive selected from the group consisting of solubilizers and evaporation control agents.

5. A composition according to claim 4, wherein said at least one additive is selected from the group consisting of liquid aliphatic hydrocarbons having boiling points of up to 200° C., lower alcohols having 1 to 5 carbon atoms, lower ketones and lower carboxylic acid esters.

6. A composition according to claim 5, wherein said at least one additive forms an azeotrope or azeotrope-like mixture with the 1-chloro-2,2,2-trifluoroethyl difluoromethyl ether.

7. A composition according to claim 4, comprising from 1 to 40% by weight of at least one additive selected from the group consisting of solubilizers and evaporation control agents.

8. A composition according to claim 1, wherein said agent having a lubricant action is selected from the group consisting of waxes, wax derivatives obtained by sulfochlorination, sulfidization, hydrogenation or hydrogen fluoride treatment of long-chain esters of carboxylic acids with monoalcohols having a total of 34 to 50 carbon atoms, silicones, metal soaps, and inorganic powders.

9. A composition according to claim 1, wherein said agent having a lubricant action is selected from the group consisting of esters of long-chain carboxylic acids and monoalcohols having a total of 34 to 50 carbon atoms, derivatives thereof obtained by sulfochlorination or sulfidization, derivatives thereof obtained by hydrogenation, and derivatives thereof obtained by treatment with hydrogen fluoride.

10. A composition according to claim 1, wherein said agent having a lubricant action is a wax or wax derivative obtained by sulfochlorination, sulfidization, hydrogenation or hydrogen fluoride treatment of long-chain esters of carboxylic acids with monoalcohols having a total of 34 to 50 carbon atoms, said agent having an iodine number of less than 95.

11. A composition according to claim 1, which comprises up to 1% by weight of an additive selected from the group consisting of stabilizers and corrosion inhibitors.

12. A composition according to claim 1, useful as a coolant lubricant, wherein said agent having a lubricant action is a lubricant agent selected from the group consisting of waxes and wax derivatives obtained by sulfochlorination, sulfidization, hydrogenation or hydrogen fluoride treatment of long-chain esters of carboxylic acids with monoalcohols having a total of 34 to 50 carbon atoms, and is present in an amount from 0.1 to 25% by weight of said composition.

13. A composition according to claim 12, wherein said lubricant agent is present in an amount from 0.5 to 5% by weight of said composition.

14. A composition according to claim 12, further comprising from 1 to 40% by weight of at least one additive selected from the group consisting of solubilizers and evaporation-control agents.

15. A composition according to claim 14, which comprises from 1 to 15% by weight of said at least one additive selected from the group consisting of solubilizers and evaporation control agents.

16. In a process for forming a metal article comprising the step of machining a piece of metal with a tool, the improvement comprising introducing between said piece of metal and said tool an effective cooling and lubricating amount of a coolant lubricant composition comprising 1-chloro-2,2,2-trifluoroethyl difluoromethyl ether and at least one other agent having a lubricant action.

17. A liquid composition useful as a release agent comprising 1-chloro-2,2,2-trifluoroethyl difluoromethyl ether, at least one agent having a release action, and at least one additive selected from the group consisting of evaporation-control agents, solubilizers, corrosion inhibitors and stabilizers.

18. A composition according to claim 17, useful as a release agent, wherein said agent having a release action is a release agent which is present in an amount from 0.1 to 35% by weight of said composition.

19. A composition according to claim 18, wherein said release agent is selected from the group consisting of waxes, wax derivatives obtained by sulfochlorination, sulfidization, hydrogenation or hydrogen fluoride treatment of long-chain esters of carboxylic acids with monoalcohols having a total of 34 to 50 carbon atoms, polyethylenes, silicone oils and metal soaps of the metals magnesium, calcium, zinc, aluminum or lead.

20. A composition according to claim 18, which comprises from 10 to 80% by weight of a solubilizer which is a petroleum fraction boiling within the range from 100° to 140° C.

21. A composition according to claim 17, which comprises at least 15% by weight 1-chloro-2,2,2-trifluoroethyl difluoromethyl ether and 0.1 to 80% by weight of said at least one agent having a release action.

22. A composition according to claim 21, which comprises from 0.1 to 40% by weight of said at least one agent having a release action.

23. A composition according to claim 17, which comprises up to 80% by weight of at least one additive selected from the group consisting of solubilizers and evaporation control agents.

24. A composition according to claim 23, wherein said at least one additive is selected from the group consisting of liquid aliphatic hydrocarbons having boiling points of up to 200° C., lower alcohols having 1 to 5 carbon atoms, lower ketones and lower carboxylic acid esters.

25. A composition according to claim 24, wherein said at least one additive forms an azeotrope or azeotrope-like mixture with the 1-chloro-2,2,2-trifluoroethyl difluoromethyl ether.

26. A composition according to claim 23, comprising from 1 to 40% by weight of at least one additive selected from the group consisting of solubilizers and evaporation control agents.

27. A composition according to claim 17, wherein said agent having a release action is selected from the group consisting of waxes, wax derivatives obtained by sulfochlorination, sulfidization, hydrogenation or hydrogen fluoride treatment of long-chain esters of carboxylic acids with monoalcohols having a total of 34 to 50 carbon atoms, silicones, metal soaps, and inorganic powders.

28. A composition according to claim 17, wherein said agent having a release action is selected from the group consisting of esters of long-chain carboxylic acids and monoalcohols having a total of 34 to 50 carbon atoms, derivatives thereof obtained by sulfochlorination or sulfidization, derivatives thereof obtained by hydrogenation, and derivatives thereof obtained by treatment with hydrogen fluoride.

29. A composition according to claim 17, wherein said agent having a release action is a wax or wax derivative obtained by sulfochlorination, sulfidization, hydrogenation or hydrogen fluoride treatment of long-chain esters of carboxylic acids with monoalcohols having a total of 34 to 50 carbon atoms, said agent having an iodine number of less than 95.

30. A composition according to claim 17, which comprises up to 1% by weight of an additive selected from the group consisting of stabilizers and corrosion inhibitors.

31. In a process for forming a shaped article comprising the steps of forming the article to a desired shape against a forming tool, and thereafter separating the formed article from the forming tool, the improvement comprising coating said forming tool with an effective release promoting amount of a composition according to claim 24.

* * * * *